US009086111B2

(12) United States Patent
Kim

(10) Patent No.: US 9,086,111 B2
(45) Date of Patent: Jul. 21, 2015

(54) VALVE ASSEMBLY OF SHOCK ABSORBER

(71) Applicant: MANDO CORPORATION, Pyeongtaek-si, Gyeonggi-do (KR)

(72) Inventor: Tae Ju Kim, Iksan-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/965,780

(22) Filed: Aug. 13, 2013

(65) Prior Publication Data

US 2014/0048365 A1    Feb. 20, 2014

(30) Foreign Application Priority Data

Aug. 14, 2012   (KR) .................. 10-2012-0088815

(51) Int. Cl.
*F16F 9/512* (2006.01)
*F16F 9/34* (2006.01)

(52) U.S. Cl.
CPC .............. *F16F 9/34* (2013.01); *F16F 9/5126* (2013.01)

(58) Field of Classification Search
CPC .......... F16F 9/504; F16F 9/512; F16F 9/5126
USPC ........................................ 188/280, 322.15
See application file for complete search history.

(56) References Cited

U.S. PATENT DOCUMENTS

| 5,129,488 | A | * | 7/1992 | Furuya et al. | 188/282.6 |
| 5,386,892 | A | * | 2/1995 | Ashiba | 188/282.8 |
| 2012/0234639 | A1 | * | 9/2012 | Teraoka et al. | 188/280 |
| 2012/0312648 | A1 | * | 12/2012 | Yu et al. | 188/280 |
| 2013/0020158 | A1 | * | 1/2013 | Park | 188/280 |
| 2013/0048451 | A1 | * | 2/2013 | Yamashita | 188/280 |
| 2013/0140117 | A1 | * | 6/2013 | Yu | 188/280 |

FOREIGN PATENT DOCUMENTS

KR    20-1995-0011204 U    5/1995

* cited by examiner

*Primary Examiner* — Bradley King
(74) *Attorney, Agent, or Firm* — McDermott Will & Emery LLP

(57) ABSTRACT

A valve assembly of a shock absorber can achieve both an effect of varying an attenuation force according to a frequency region of vibration or shock transferred to the shock absorber during the driving of an automobile and an effect of varying an attenuation force according to an additional pressure and can increase the attenuation force in response to an instantaneous input of a large amplitude behavior. The valve assembly includes: a valve housing coupled to a piston rod having an orifice hole and a space formed therein, the space having an open lower end to communicate with the orifice hole; a frequency sensitive valve unit including a free piston configured to vertically partition the space; and a sub-valve unit coupled to the lower end of the space, wherein operation of the sub-valve unit is controlled by ascending and descending of the free piston.

3 Claims, 4 Drawing Sheets

VALVE ASSEMBLY OF SHOCK ABSORBER

BACKGROUND OF THE INVENTION

1. Field of the Invention

The present invention relates to a valve assembly, and more particularly, to a valve assembly of a shock absorber, which can achieve both an effect of varying an attenuation force according to a frequency region of vibration or shock transferred to the shock absorber during the driving of an automobile and an effect of varying an attenuation force according to an additional pressure and can increase the attenuation force in response to an instantaneous input of a large amplitude behavior.

2. Description of the Prior Art

In general, a vehicle continuously receives vibration or a shock from a road surface through the wheels during driving. Thus, a shock absorbing device is provided between the vehicle body and the vehicle axle so as to prevent the shock or vibration from being directly transferred to the vehicle body, thereby improving ride comfort. In addition, the shock absorbing device suppresses the irregular vibration of the vehicle body, so as to enhance the driving stability.

A suspension system, which is a general name of a connection device between a vehicle axle and a vehicle body including the shock absorbing device as described above, includes a chassis spring configured to relieve shock, a shock absorber configured to control the free vibration of the chassis spring so as to improve ride comfort, a stabilizer configured to prevent rolling, a rubber bushing, and a control arm.

In the suspension system, especially, the shock absorber serves to suppress and attenuate vibration from the road surface and is mounted between the vehicle body or a frame and a wheel. In particular, the shock absorber absorbs the vibration energy of the vehicle body in the vertical direction, so as to suppress vibration, improve the ride comfort, and protect cargo on board. In addition, the shock absorber increases the service life of the vehicle by reducing dynamic stresses at each portion of the vehicle body and secures tires' road holding by suppressing the motion of a mass below the spring. Furthermore, the shock absorber improves the motional performance of the vehicle by suppressing change in the vehicle's posture caused by an inertial force.

Accordingly, the ride comfort and handling stability of the vehicle may be suitably adjusted according to the attenuation force characteristic of the shock absorber. That is, during the normal driving of the vehicle, it may be needed to reduce the attenuation force so as to improve ride comfort. Further, when quickly turning the vehicle or during the high-speed driving of the vehicle, it may be needed to increase the attenuation force so as to enhance the handling stability.

FIG. 1 illustrates a conventional shock absorber.

As illustrated in FIG. 1, the shock absorber 1 includes a cylinder 2 filled with hydraulic fluid, a piston rod 3 of which one end is positioned inside the cylinder 2 and the other end extends to the outside of the cylinder 2, and a piston valve 4 mounted at the one end of the piston rod 3 to reciprocate in the cylinder 2.

The cylinder 2 may include an inner tube 2a and an outer tube 2b, and a base valve 5 is installed at the lower end of the cylinder 2 to face the piston valve 4.

The inside of the cylinder 2 is divided into an extension chamber C1 and a compression chamber C2 by the piston valve 4. When the piston valve 4 reciprocates up and down within the cylinder 2, the hydraulic fluid flows from the extension chamber C1 to the compression chamber C2 or from the compression chamber C2 to the extension chamber C1 through an orifice (not shown) formed in the piston valve 4, thereby generating an attenuation force.

The conventional shock absorber 1 configured as described above is adapted to generate the attenuation force using a pressure difference between the tension chamber C1 and the compression chamber C2 which occurs according to the rectilinear reciprocation of the piston rod 3 connected to the vehicle body. Thus, when the moving stroke of the piston rod 3 is large or at a low frequency shock region, a proper attenuation force is generated to smoothly absorb vibration. However, when the moving stroke of the piston rod 3 is small or at a high frequency shock region, the conventional shock absorber 1 is problematic.

That is, for example, when a high frequency vibration or shock having a small amplitude and frequent vibration is applied, the pressure difference between the extension chamber C1 and the compression chamber C2 is too small to enable the piston valve 4 to smoothly operate, which results in failure in obtaining a proper attenuation force. As a result, such vibration is transferred to a rider without being completely absorbed, so as to degrade the ride comport.

Therefore, it is necessary to control the attenuation force according to the frequency difference as well as the input speed of the shock. To this end, a shock absorber having a frequency sensitive valve device additionally provided under a main valve unit vertically dividing a cylinder into an upper part and a lower part has been disclosed in Korean Utility Model Laid-Open Publication No. 20-1995-0011204 (Patent Document 1).

However, the conventional shock absorber having a frequency sensitive valve device does not have any means for controlling the pressure additionally generated according to the speed change, besides the main valve unit. Further, although it is necessary to increase the attenuation force in order to stably control the behavior of the vehicle body at a high speed operation in which the piston rod moves at a high speed due to application of an instantaneous large impact, the conventional shock absorber undergoes loss of the attenuation force because the hydraulic fluid is drained through a bypass fluid channel formed at one side of the frequency sensitive valve device in the conventional shock absorber.

For example, in the case of the shock absorber disclosed in Patent Document 1, when a low frequency shock is input, the oil flows not only through the piston valve but also through the orifice of the rotary valve. Therefore, this conventional shock absorber undergoes loss of the attenuation force through the rotary valve at the time of high speed behavior.

PRIOR ART DOCUMENT

Patent Document 1: Korean Utility Model Laid-Open Publication No. 20-1995-0011204 (published on May 15, 1995)

SUMMARY OF THE INVENTION

Accordingly, the present invention has been made to solve the above-mentioned problems occurring in the prior art, and an exemplary embodiment of the present invention is directed to a valve assembly of a shock absorber, which can achieve both an effect of varying an attenuation force according to a pressure and an effect of varying an attenuation force according to a frequency region.

Further, an embodiment of the present invention is directed to a valve assembly of a shock absorber, which includes not only a pressure sensitive main valve unit but also a sub-valve unit, so that the valve assembly can control the pressure additionally generated according to the speed change.

Further, an embodiment of the present invention is directed to a valve assembly of a shock absorber, which includes a pressure sensitive main valve unit, a sub-valve unit, and a frequency sensitive valve unit, and blocks a fluid channel from the frequency sensitive valve unit to the sub-valve unit to increase the attenuation force by the operation of the main valve unit at the time of high speed operation in which a large shock is instantaneously applied.

Furthermore, an exemplary embodiment of the present invention is directed to a valve assembly of a shock absorber, which can prevent the occurrence of spring friction sounds in a frequency sensitive valve.

In accordance with an aspect of the present invention, a valve assembly of a shock absorber is provided. The valve assembly includes: a valve housing coupled to a lower end of a piston rod having an orifice hole formed through the piston rod, the valve housing having a space formed therein, the space having an open lower end to communicate with the orifice hole; a frequency sensitive valve unit including a free piston configured to vertically partition the space into an upper chamber and a lower chamber and a lower stopper extending downward from a center of the free piston; and a sub-valve unit coupled to the lower end of the space and having a compression orifice and an extension orifice, wherein operation of the sub-valve unit is controlled by ascending and descending of the free piston.

The free piston may include a support portion having upper and lower surfaces, which support ends of elastic members, respectively, and a side wall extending downward from a circumference of the support portion.

The sub-valve unit may include a valve body coupled to the lower end of the space and a suction valve provided at an upper portion of the valve body to open or close the compression orifice, and a side fluid channel is formed between the suction valve and the side wall.

In the valve assembly, an assembling pin pressing and supporting the suction valve toward an upper side of the valve body may be assembled with an upper side of the suction valve, and the lower stopper may be supported by an upper end of the assembling pin when the free piston is lowered.

When the lower stopper is elastically deformed, the side wall is in close contact with and supported by the upper side of the suction valve to block the side fluid channel.

Since the valve assembly of the shock absorber according to an exemplary embodiment of the present invention includes a pressure sensitive main valve unit, a sub-valve unit, and a frequency sensitive valve unit, the valve assembly can achieve both an effect of varying an attenuation force according to a pressure and an effect of an attenuation force according to a frequency region.

Further, the valve assembly of the shock absorber according to an exemplary embodiment of the present invention can control the pressure, which is additionally generated according to the speed change, through the sub-valve unit, so as to enhance the ride comfort.

Further, in the valve assembly, at the time of instantaneous high speed behavior, a side fluid channel communicating with the sub-valve unit is blocked by the free piston, so as to increase the attenuation force of the main valve unit and thus achieve a stable behavior of the vehicle body.

Moreover, truncated-conical coil springs employed by the valve assembly can prevent the generation of spring frictional noise in the frequency sensitive valve, so as to enhance the emotional quality.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
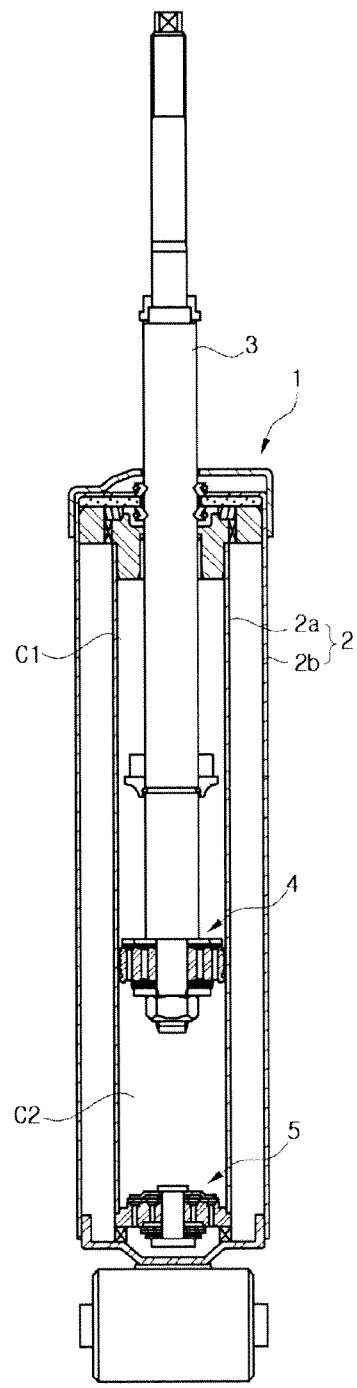
FIG. 1 is a cross-sectional view of a conventional shock absorber.

Hereinafter, an exemplary embodiment of a valve assembly of a shock absorber according to an exemplary embodiment will be described with reference of the accompanying drawings. In the drawings, the thicknesses of lines shown in the drawings, the sizes of components or the like may be exaggeratively indicated for the clarity and convenience of description.

In addition, the terms used in the following description are those defined in consideration of the functions thereof and may be varied according to an intention of a user or an operator or a practice. Thus, the definitions of the terms should be made based on the contents over the entirety of the present specification.

Furthermore, the exemplary embodiments described below are not intended to limit the scope of the present invention but merely to exemplify configurational elements defined in the claims. An embodiment which belongs to the technical idea described over the entirety of the present specification and includes a configurational element capable of being substituted for a configurational element in the claims as an equivalent may be included in the scope of the present invention.

Embodiments

Figure 2:
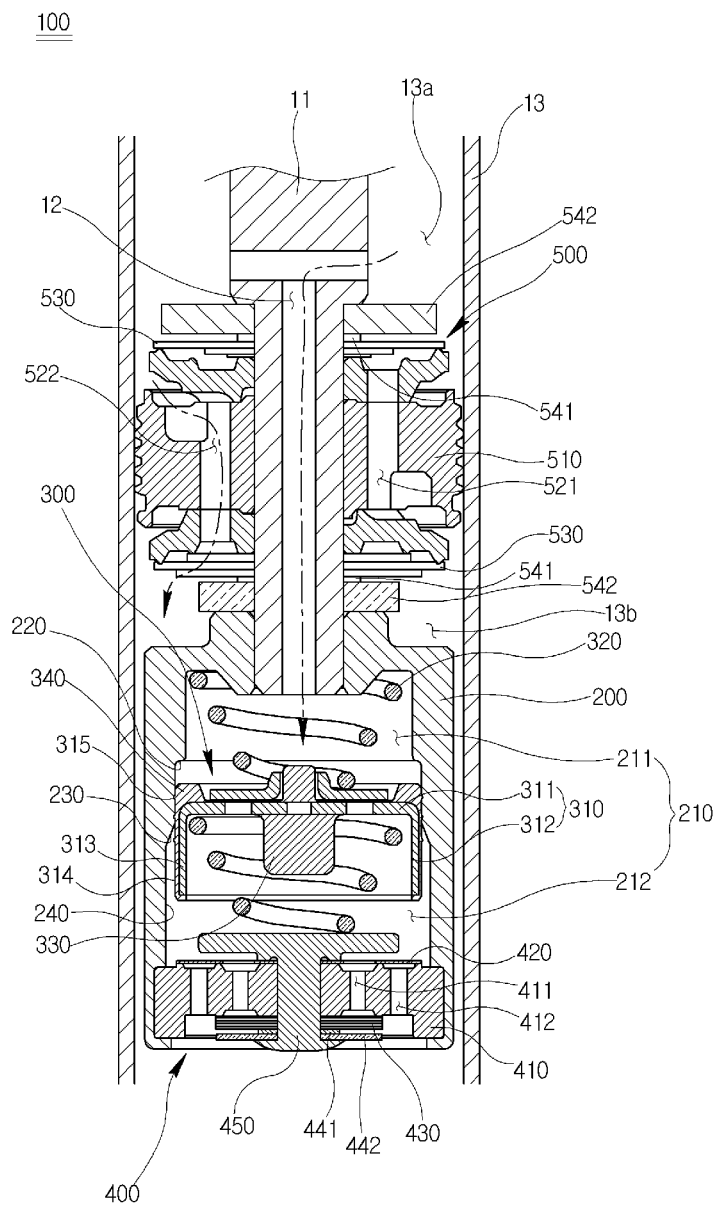
FIG. 2 is a cross-sectional view of a valve assembly of a shock absorber according to an embodiment of the present invention, which shows an initial installation state of the valve assembly.
Figure 3:
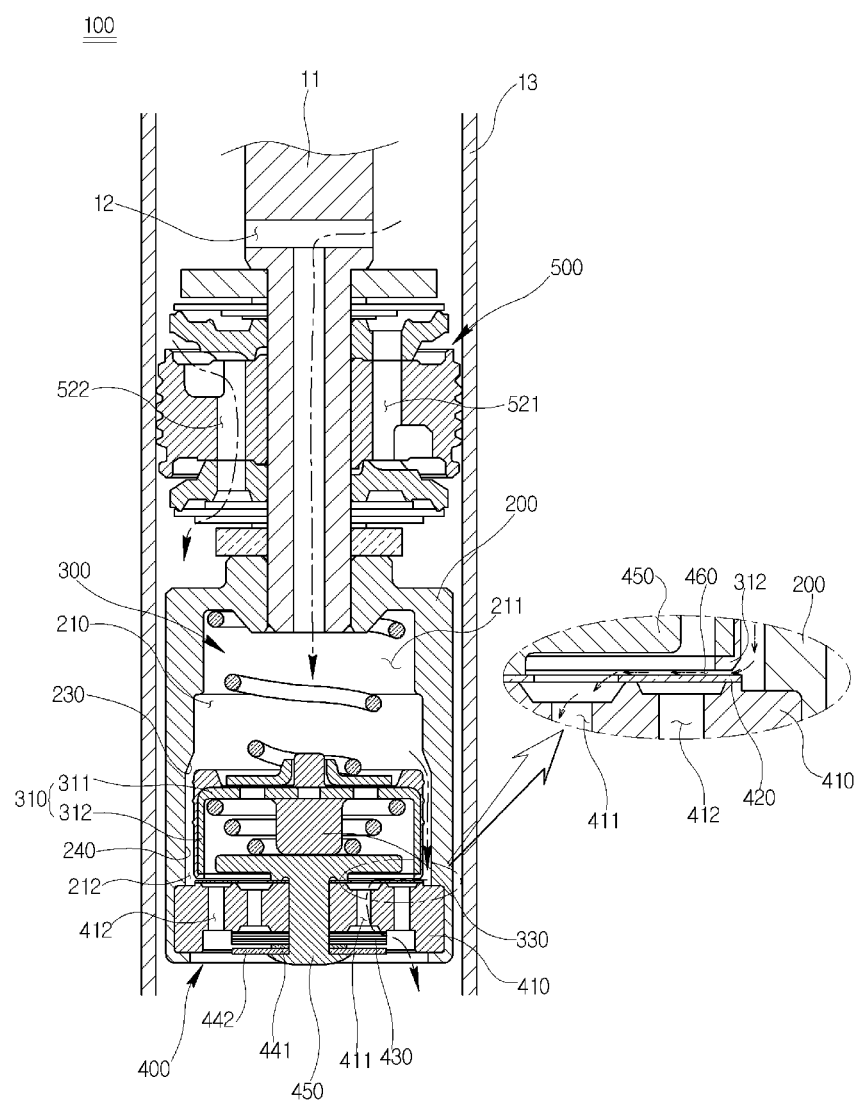
FIG. 3 is a cross-sectional view showing an operation state of a sub-valve unit according to an embodiment of the present invention.
Figure 4:
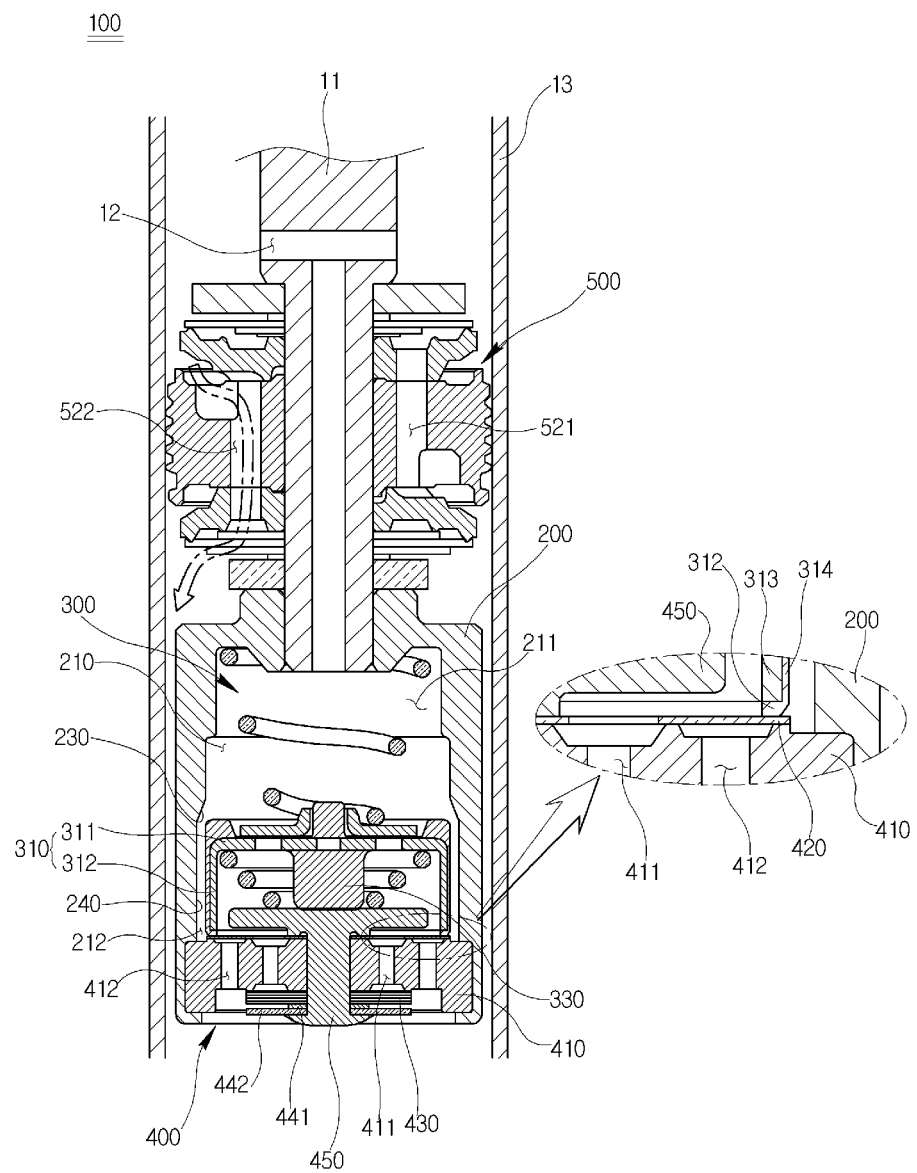
FIG. 4 is a cross-sectional view showing a state in which a side fluid channel is blocked in response to an instantaneous input of a large shock or a large amplitude behavior, so as to block the operation of the sub-valve unit.

FIG. 2 is a cross-sectional view of a valve assembly of a shock absorber according to an embodiment of the present invention, which shows an initial installation state of the valve assembly, FIG. 3 is a cross-sectional view showing an operation state of a sub-valve unit according to an embodiment of the present invention, and FIG. 4 is a cross-sectional view showing a state in which a side fluid channel is blocked in response to an instantaneous input of a large shock or a large amplitude behavior, so as to block the operation of the sub-valve unit.

As shown in FIG. 2, a valve assembly 100 of a shock absorber according to an embodiment of the present invention is assembled with a lower end of a piston rod 11 and includes a frequency sensitive valve unit 300 and a sub-valve unit 400 which are vertically disposed up and down.

More specifically, the valve assembly 100 of the shock absorber according to the exemplary embodiment of the present invention includes a valve housing 200 coupled to the lower end of the piston rod 11, a frequency sensitive valve unit 300 installed in a space 210 within the valve housing 200, and a sub-valve unit 400 coupled to the lower end of the space 210 of the valve housing 200.

The main valve unit 500 is assembled with an outer circumferential surface of the piston rod 11 to be disposed at an upper part of the valve assembly 100.

The main valve unit 500 includes: a valve body 510 having an outer circumferential surface in close contact with the inner circumferential surface of the cylinder 13 so as to vertically divide the inside of the cylinder 13 into an extension chamber 13a and a compression chamber 13b, a plurality of fluid channels 521 and 522 formed through the valve body 510 in the vertical direction, and leaf valves 530 provided on the top surface and the bottom surface of the valve body 510, respectively, to open/close the fluid channels 521 and 522.

The fluid channels 521 and 522 may be classified into a compression fluid channel 521 and an extension fluid channel 522 depending on whether they are opened at a compression stroke or an extension stroke according to the elevation of the piston rod 11. For example, at the compression stroke where the piston rod 11 is lowered, the hydraulic fluid of the compression chamber 13b flows upwardly toward the extension chamber 13a through the compression fluid channel 521.

In addition, retainers 541 and washers 542 are coupled to the outer circumferential surface of the piston rod 11 at the top side of the leaf valve 530 configured to open/close the compression fluid channel 521 and at the bottom side of the leaf valve 530 configured to open/close the extension fluid channel 522, so as to support the top and bottom sides of the leaf valves 530, respectively, and when the fluid channels are opened, to limit the flexural deformation of the leaf valves 530.

The piston rod 11 is installed in the axial direction in a cylinder 13 filled with hydraulic fluid, such as oil, and reciprocates within the cylinder 13. The cylinder 13 may be configured in a single tube form or in a form divided into an inner tube and an outer tube.

An orifice hole 12 is formed through the piston rod 11 to communicate with the space 210 of the valve housing 200. Here, a plurality of orifice holes 12 may be formed such that first ends of the orifices holes 12 are spaced apart from each other in the circumferential direction of the outer circumferential surface of the piston rod 11 and second ends of the orifice holes 12 extend to the lower end of the piston rod 11 along the central axis of the piston rod 11.

In the space 210 of the valve housing 200, a frequency sensitive valve unit 300 is installed. Here, the frequency sensitive valve unit 300 may include a free piston 310, and a pair of elastic members 320 which are provided at the top and bottom sides of the free piston 310.

The free piston 310 includes a support portion 311 having upper and lower surfaces, which support the elastic members 320, respectively, and a side wall 312 extending downward from a circumference of the support portion 311. A lower stopper 330 made of an elastic material protrudes downward from a center of the support portion 311 to limit the descending distance of the free piston 310.

Further, an upper stopper 340 made of an elastic material protrudes upward from a circumference of the support portion 311 and a shoulder portion 220 is formed at an upper part of an inner circumferential surface of the valve housing 200 to be engaged with the upper stopper 340 to limit the ascending distance of the free piston 310 when the free piston 310 moves upward.

The free piston 310 may be formed by an insert injection molding. For example, the free piston 310 may be formed by preparing a core member 313, which is made of metal and has a shape of a cylinder having an open lower end, and then integrally forming a skin layer 314 made of an elastic material, such as rubber or synthetic resin, wrapped on an outer circumferential surface of the core member 313. In this event, the injection-molded skin layer 314 of each of the upper stopper 340 and the lower stopper 330 is formed to have an adjusted thickness.

Further, the outer circumferential surface of the free piston 310 is in close contact with the inner circumferential surface of the valve housing 200 surrounding the space 210 to vertically partition the space 210 into an upper part and a lower part. Specifically, a plurality of sealing protuberances 315 extending in a circumferential direction are formed on the outer circumferential surface of the free piston 310 to seal the upper part and the lower part of the space 210.

Hereinafter, the upper part of the space 210 partitioned by the free piston 310 is referred to as an upper chamber 211 and the lower part of the space 210 is referred to as a lower chamber 212.

The elastic members 320 are provided at the top and bottom sides of the free piston 310. Therefore, when the free piston 310 moves upward or downward, the elastic members 320 are elongated or compressed to provide the free piston 310 with an elastic force.

Each of the elastic members 320 may be formed preferably by a coil spring, which may specifically have a truncated cone shape. As a result, the occurrence of noise by shock or friction between the windings of the coil springs may be prevented when the coil springs are tensioned or compressed.

The frequency sensitive valve unit 300 serves to absorb a small shock of a low amplitude and high frequency. That is, while the free piston 310 moves up and down by the pressure of the hydraulic fluid flowing into the space 210, the small shock is absorbed by the elastic members 320. In this event, the extent by which the free piston 310 moves up and down may be determined by properly selecting the spring constant of the elastic members 320.

Meanwhile, when a low frequency and high amplitude shock is transferred, the upper chamber 211 and the lower chamber 212 of the space 210 of the valve housing 200 communicate with each other by the free piston 310 in order to efficiently attenuate the shock, and an additional attenuation force is generated while the hydraulic fluid, which has flown into the lower chamber 212 from the upper chamber 211, passes through the sub-valve unit 400 coupled to the lower end of the space 210. The sub-valve unit 400 may be coupled to the valve housing 200 by a coupling method such as press-fitting or screw coupling.

In order to allow the hydraulic fluid to flow from the upper chamber 211 of the valve housing 200 into the lower chamber 212, an width change portion 230 having a diameter increasing in the downward direction is formed along the circumferential direction at one side of the inner circumferential surface of the space 210 and a larger-width portion 240 is formed successively to the width change portion 230 so that the inner circumferential surface of the lower end of the width change portion 230 is wider than the inner circumferential surface of the upper end of the width change portion 230.

Therefore, when a low frequency and high amplitude shock occurs, the amount of the hydraulic fluid flowing into the upper chamber 211 through the orifice hole 12 rapidly increases, and the pressure of the hydraulic fluid flowing into the upper chamber 211 moves the free piston 310 down toward the larger-width portion 240 beyond the width change portion 230 as illustrated in FIG. 3.

Then, a gap is formed between the outer circumferential surface of the free piston 310 and the inner circumferential surface of the space 210 and, through the fluid channel formed by this gap, the hydraulic fluid of the upper chamber 211 flows into the lower chamber 212.

The hydraulic fluid, which has flowed into the lower chamber 212 as described above, generates an attenuation force while it passes through the sub-valve unit 400. The sub-valve unit 400 includes a valve body 410, extension orifices 411 formed through the valve body 510 in the vertical direction, and compression orifices 412 formed radially outside of the extension orifices 411.

The valve body 410 is coupled to the lower end of the space 210 of the valve housing 200 by a method such as press-fitting or screw coupling, a suction valve 420 of a single plate configured to open/close the compression orifices 410 is provided at the upper side of the valve body 410, and a multi-plate disc 430 configured to open/close the extension orifices 411 is provided together with a retainer 441 and a washer 442 at the lower side of the valve body 411. The suction valve 420, the multi-plate disc 430, the retainer 441, and the washer 442 are fixed to the valve body 410 by an assembling pin 450.

Thus, when a low frequency and high amplitude shock is input, the hydraulic fluid, which has flowed into the lower chamber 212 while pushing the free piston 310, flows into the compression chamber 13b while pushing the multi-plate disc 430 downward through the extension orifices 411 of the sub-valve unit 400 to open the multi-plate disc 430, thereby generating an attenuation force.

In this event, the pressure of the hydraulic fluid introduced into the upper chamber 211 makes the free piston 310 go on moving downward until the lower stopper 330 comes into contact with and is supported by the upper end of the assembling pin 450. Then, the hydraulic fluid flows into the extension orifices 411 through a side fluid channel 460 formed between the upper surface of the suction valve 420 and the lower end of the side wall 312 of the free piston 310.

Meanwhile, when the moving speed of the piston rod 11 instantaneously increases due to an instantaneous input of a large shock or a large amplitude behavior, it is necessary to increase the attenuation force of the shock absorber to control the behavior of the vehicle.

In this event, according to an embodiment of the present invention, the side fluid channel 460 (see FIG. 3) is blocked by the side wall 312 of the free piston 310, so as to block the flow of the hydraulic fluid through the sub-valve unit 400 and allow generation of the attenuation force only through the fluid channels 521 and 522 of the main valve unit 500.

In other words, as shown in FIG. 4, when the lower stopper 330 made of an elastic material is pressed and deformed downward by the pressure of the hydraulic fluid due to the increase of the quantity of the hydraulic fluid introduced into the upper chamber 211, the lower of the side wall 312 located at an upper part of the suction valve 420 is lowered to come into close contact with and be supported by the upper side of the suction valve 420, so as to block the side fluid channel 460 (see FIG. 3) and thus prevent the hydraulic fluid from flowing through the sub-valve unit 400.

In this event, the hydraulic fluid passes through the fluid channels 521 and 522 of the main valve unit 500 to generate an attenuation force, while the flow of the hydraulic fluid through the orifices 411 and 413 of the sub-valve unit 400 is prevented. As a result, the entire attenuation force of the shock absorber increases.

What is claimed is:

1. A valve assembly of a shock absorber, comprising:
   a valve housing coupled to a lower end of a piston rod having an orifice hole formed through the piston rod, the valve housing having a space formed therein, a lower end of the space being open to communicate with the orifice hole;
   a frequency sensitive valve unit including a free piston configured to vertically partition the space into an upper chamber and a lower chamber and a lower stopper extending downward from a center of the free piston; and
   a sub-valve unit disposed in the lower end of the space and having a compression orifice and an extension orifice,
   wherein operation of the sub-valve unit is controlled by ascending and descending of the free piston,
   wherein the sub-valve unit comprises a valve body disposed in the lower end of the space and a suction valve provided at an upper portion of the valve body to open or close the compression orifice, and a side fluid channel is formed between an upper surface of the suction valve and a lower end of a side wall, and
   wherein the side wall is in close contact with and supported by an upper side of the suction valve to block the side fluid channel when the lower stopper is elastically deformed.

2. The valve assembly of claim 1, wherein the free piston comprises a support portion having upper and lower surfaces, which support ends of elastic members, respectively, and the side wall extending downward from a circumference of the support portion.

3. The valve assembly of claim 1, wherein an assembling pin pressing and supporting the suction valve toward an upper side of the valve body is assembled with the upper side of the suction valve, and the lower stopper is supported by an upper end of the assembling pin when the free piston is lowered.

* * * * *